(12) United States Patent
Castro

(10) Patent No.: US 6,505,880 B1
(45) Date of Patent: Jan. 14, 2003

(54) PASSENGER COMPARTMENT COVER FOR A CONVERTIBLE VEHICLE

(76) Inventor: Miguel A. Castro, 13-19 125th St., #1 F, College Point, NY (US) 11356

( * ) Notice: Subject to any disclaimer, the term of this patent is extended or adjusted under 35 U.S.C. 154(b) by 0 days.

(21) Appl. No.: 09/931,830

(22) Filed: Aug. 17, 2001

(51) Int. Cl.$^7$ .................................................. B60J 7/00
(52) U.S. Cl. ................. 296/102; 296/147; 160/DIG. 2; 135/9.3
(58) Field of Search ........................... 296/102, 107.09, 296/107.01, 77.1, 138, 141, 147; 160/DIG. 2; 135/913

(56) References Cited

U.S. PATENT DOCUMENTS

| | | | |
|---|---|---|---|
| 1,432,219 A | * 10/1922 | Sundback | .............. 160/DIG. 2 |
| 1,614,010 A | * 1/1927 | Martinov | ..................... 296/145 |
| 3,037,809 A | 6/1962 | Praha | |
| 3,650,542 A | 3/1972 | Shimano et al. | |
| 4,611,849 A | * 9/1986 | Trenkler | ................. 296/145 X |
| D335,856 S | 5/1993 | Sazama | |
| 5,290,086 A | 3/1994 | Tucker | |
| 5,547,219 A | 8/1996 | Ha | |
| 5,551,726 A | 9/1996 | Ament | |
| 5,788,317 A | * 8/1998 | Nation | ....................... 296/141 |
| 6,279,986 B1 | * 8/2001 | Hinsperger | ................. 296/102 |
| 6,338,522 B1 | * 1/2002 | LeBlanc | ............ 296/107.09 X |

FOREIGN PATENT DOCUMENTS

FR  627875  * 10/1927 ............ 296/107.09

* cited by examiner

Primary Examiner—Dennis H. Pedder

(57) ABSTRACT

A passenger compartment cover for a convertible vehicle for screening out debris, sunlight glare, and insects from the users in the passenger compartment of a convertible vehicle. The passenger compartment cover for a convertible vehicle includes sheets of mesh material being securely attached to one another and being adapted to cover a passenger compartment of a convertible vehicle; and also includes pieces of mesh material being fastenable to the sheets of mesh material and forming windows therein; and further includes fastening members being attached to the sheets of mesh material and the pieces of mesh material for fastening the sheets of mesh material and the pieces of mesh material to the convertible vehicle.

4 Claims, 2 Drawing Sheets

PASSENGER COMPARTMENT COVER FOR A CONVERTIBLE VEHICLE

BACKGROUND OF THE INVENTION

1. Field of the Invention

The present invention relates to passenger compartment covers for convertible vehicles and more particularly pertains to a new passenger compartment cover for a convertible vehicle for screening out debris, sunlight glare, and insects from the users in the passenger compartment of a convertible vehicle.

2. Description of the Prior Art

The use of passenger compartment covers for convertible vehicles is known in the prior art. More specifically, passenger compartment covers for convertible vehicles heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 5,290,086; 5,551,726; 3,037,809; 5,547,219; U.S. Pat. No. Des. 335,856; and 3,650,542.

While these devices fulfill their respective, particular objectives and requirements, the aforementioned patents do not disclose a new passenger compartment cover for a convertible vehicle. The inventive device includes sheets of mesh material being securely attached to one another and being adapted to cover a passenger compartment of a convertible vehicle; and also includes pieces of mesh material being fastenable to the sheets of mesh material and forming windows therein; and further includes fastening members being attached to the sheets of mesh material and the pieces of mesh material for fastening the sheets of mesh material and the pieces of mesh material to the convertible vehicle.

In these respects, the passenger compartment cover for a convertible vehicle according to the present invention substantially departs from the conventional concepts and designs of the prior art, and in so doing provides an apparatus primarily developed for the purpose of screening out debris, sunlight glare, and insects from the users in the passenger compartment of a convertible vehicle.

SUMMARY OF THE INVENTION

In view of the foregoing disadvantages inherent in the known types of passenger compartment covers for convertible vehicles now present in the prior art, the present invention provides a new passenger compartment cover for a convertible vehicle construction wherein the same can be utilized for screening out debris, sunlight glare, and insects from the users in the passenger compartment of a convertible vehicle.

The general purpose of the present invention, which will be described subsequently in greater detail, is to provide a new passenger compartment cover for a convertible vehicle which has many of the advantages of the passenger compartment covers for convertible vehicles mentioned heretofore and many novel features that result in a new passenger compartment cover for a convertible vehicle which is not anticipated, rendered obvious, suggested, or even implied by any of the prior art passenger compartment covers for convertible vehicles, either alone or in any combination thereof.

To attain this, the present invention generally comprises sheets of mesh material being securely attached to one another and being adapted to cover a passenger compartment of a convertible vehicle; and also includes pieces of mesh material being fastenable to the sheets of mesh material and forming windows therein; and further includes fastening members being attached to the sheets of mesh material and the pieces of mesh material for fastening the sheets of mesh material and the pieces of mesh material to the convertible vehicle.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new passenger compartment cover for a convertible vehicle which has many of the advantages of the passenger compartment covers for convertible vehicles mentioned heretofore and many novel features that result in a new passenger compartment cover for a convertible vehicle which is not anticipated, rendered obvious, suggested, or even implied by any of the prior art passenger compartment covers for convertible vehicles, either alone or in any combination thereof.

It is another object of the present invention to provide a new passenger compartment cover for a convertible vehicle which may be easily and efficiently manufactured and marketed.

It is a further object of the present invention to provide a new passenger compartment cover for a convertible vehicle which is of a durable and reliable construction.

An even further object of the present invention is to provide a new passenger compartment cover for a convertible vehicle which is susceptible of a low cost of manufacture with regard to both materials and labor, and which accordingly is then susceptible of low prices of sale to the consuming public, thereby making such passenger compartment cover for a convertible vehicle economically available to the buying public.

Still yet another object of the present invention is to provide a new passenger compartment cover for a convertible vehicle which provides in the apparatuses and methods of the prior art some of the advantages thereof, while simultaneously overcoming some of the disadvantages normally associated therewith.

Still another object of the present invention is to provide a new passenger compartment cover for a convertible vehicle for screening out debris, sunlight glare, and insects from the users in the passenger compartment of a convertible vehicle.

Yet another object of the present invention is to provide a new passenger compartment cover for a convertible vehicle which includes sheets of mesh material being securely attached to one another and being adapted to cover a passenger compartment of a convertible vehicle; and also includes pieces of mesh material being fastenable to the sheets of mesh material and forming windows therein; and further includes fastening members being attached to the sheets of mesh material and the pieces of mesh material for fastening the sheets of mesh material and the pieces of mesh material to the convertible vehicle.

Still yet another object of the present invention is to provide a new passenger compartment cover for a convertible vehicle that is easy and convenient to use.

Even still another object of the present invention is to provide a new passenger compartment cover for a convertible vehicle that is lightweight and easily storable by being easily rolled up and secured with straps.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
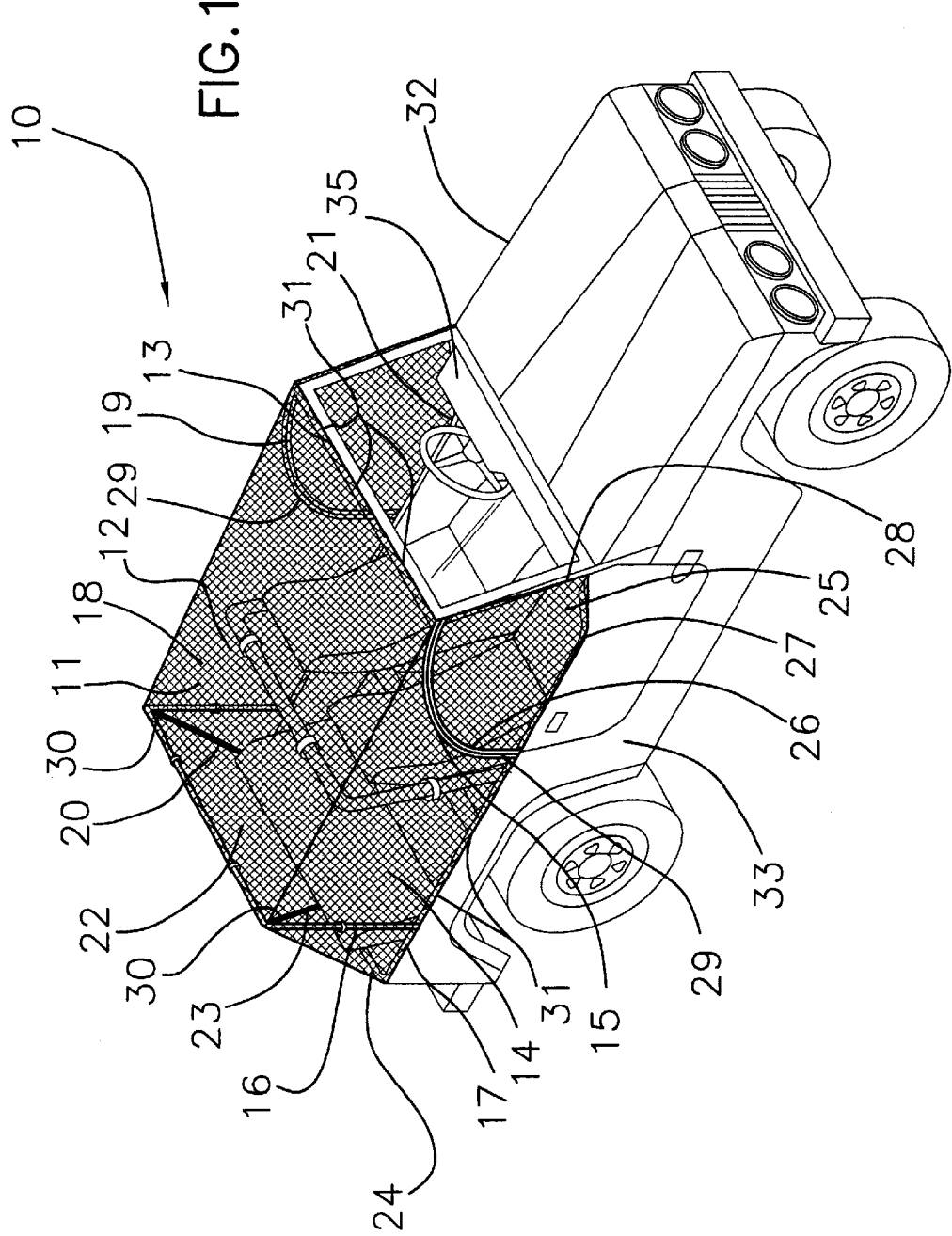
FIG. 1 is a perspective view of a new passenger compartment cover for a convertible vehicle according to the present invention.
Figure 2:
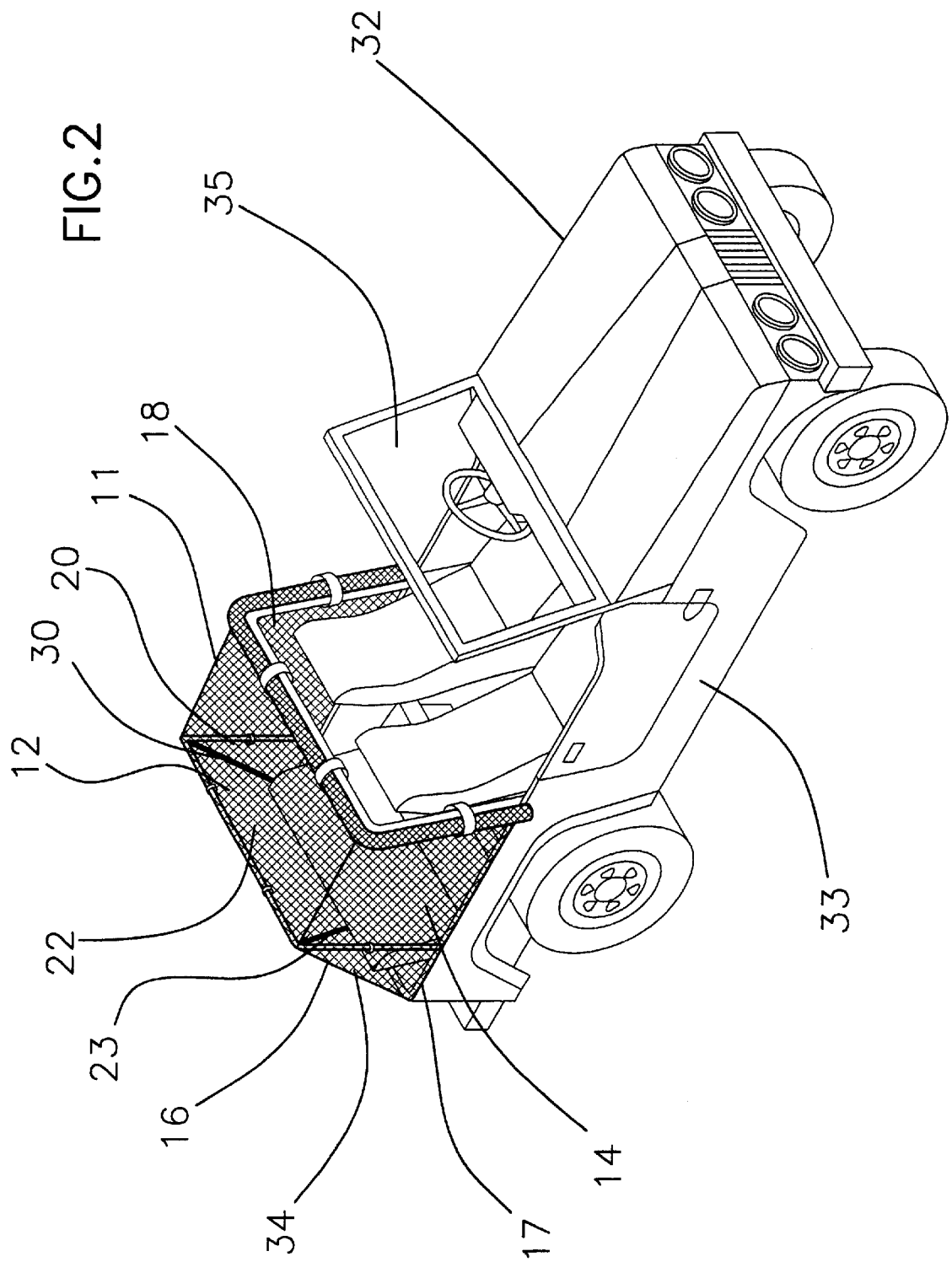
FIG. 2 is a perspective view of the present invention being rolled up for storage.

With reference now to the drawings, and in particular to FIGS. 1 through 2 thereof, a new passenger compartment cover for a convertible vehicle embodying the principles and concepts of the present invention and generally designated by the reference numeral 10 will be described.

As best illustrated in FIGS. 1 through 2, the passenger compartment cover for a convertible vehicle 10 generally comprises sheets of mesh material 11 being securely and conventionally attached to one another and being adapted to cover a passenger compartment of a convertible vehicle 32. The sheets of mesh material 11 include a top wall 12, a back wall 22, and side walls 14, 18 which are adapted to be fastened to side walls 33 of the convertible vehicle 32. The back wall 22 has side edges 23 which are fastened with fastener members 30 to back edges 16, 20 of the side walls 14, 18 of the sheets of mesh material 11 with the fastener members 30 being zippers. As can be seen in FIG. 1, a single sheet of mesh material may be employed with portions of the sheet of mesh material forming the top, back, and side panels of portions of the cover.

Pieces of mesh material 25 are fastenable to the sheets of mesh material 11 and form windows therein. Each of the pieces of mesh material 25 has a curved back edge 26 which is fastened with a zipper 29 to a curved front edge 15, 19 of a respective side wall 14, 18 of the sheets of mesh material 11. The zipper 29 is conventionally attached along the curved back edge 26 of the piece of mesh material 25 and along the curved front edge 15, 19 of the side wall 14, 18 of the sheets of mesh material 11.

Fastening members 31 are conventionally attached to the sheets of mesh material 11 and the pieces of mesh material 25 for fastening the sheets of mesh material 11 and the pieces of mesh material 25 to the convertible vehicle 33. The fastening members 31 are strips of hook and loop fasteners and are securely attached along bottom edges 17, 21, 24 of the back and side walls 14, 18, 22 and along front edges 13 of the top wall 12 of the sheets of mesh material 11 and along front and bottom edges 27, 28 of the pieces of mesh material 25 and are adapted to be securely attached along top edges of the side and back walls 33, 34 of the convertible vehicle 32 and along edges of the windshield 35.

In use, the user unrolls the sheets of mesh material 11 and the pieces of mesh material 25 and fastens them to the convertible vehicle 32 over the top of and about the passenger compartment to totally enclose the passenger compartment.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A passenger compartment cover for a convertible vehicle comprising:

a sheet of mesh material for covering a passenger compartment of a convertible vehicle;

a separable piece of mesh material being removably fastenable to said sheet of mesh material to form an egress opening in said sheet of material when mounted on the convertible vehicle;

fastening members being attached to said sheet of mesh material and said piece of mesh material for fastening said sheet of material and said piece of mesh material to the convertible vehicle, wherein said sheet of mesh material includes a top panel, a back panel, and side panels which are adapted to be fastened to side walls of the convertible vehicle; and wherein said fastening members comprise strips of hook and loop fasteners and are securely attached along bottom edges of said back and side walls of said sheet of mesh material and along bottom and front edges of said piece of mesh material and are adapted to be securely attached along top edges of the side and back walls of the convertible vehicle and along edges of the windshield.

2. A passenger compartment cover for a convertible vehicle as described in claim 1, wherein said back panel has side edges which are fastened with fastener members to back edges of said side panels of said sheet of mesh material, said fastener members being zippers.

3. A passenger compartment cover for a convertible vehicle as described in claim 1, wherein said piece of mesh material has a curved back edge which is fastened with a zipper to a curved front edge of a respective said side panel of said sheet of mesh material, said zipper being attached along said curved back edge of said piece of mesh material and along said curved front edge of said side panel of said sheet of mesh material.

4. A passenger compartment cover for a convertible vehicle comprising:

sheets of mesh material being securely attached to one another and being adapted to cover a passenger compartment of a convertible vehicle, said sheets of mesh material including a top wall, a back wall, and side walls which are adapted to be fastened to side walls of the convertible vehicle, said back wall having side edges which are fastened with fastener members to back edges of said side walls of said sheets of mesh material, said fastener members being zippers;

pieces of mesh material being fastenable to said sheets of mesh material and forming windows therein, each of said pieces of mesh material having a curved back edge which is fastened with a zipper to a curved front edge of a respective said side wall of said sheets of mesh material, said zipper being attached along said curved back edge of said piece of mesh material and along said curved front edge of said side wall of said sheets of mesh material; and fastening members being attached to said sheets of mesh material and said pieces of mesh material for fastening said sheets of mesh material and said pieces of mesh material to the convertible vehicle, said fastening members being strips of hook and loop fasteners and being securely attached along bottom edges of said back and side walls and along front edges of said top wall of said sheets of mesh material and along bottom and front edges of said pieces of mesh material and being adapted to be securely attached along top edges of the side and back walls of the convertible vehicle and along edges of the windshield.

* * * * *